(12) United States Patent
Spahic et al.

(10) Patent No.: US 12,176,710 B2
(45) Date of Patent: Dec. 24, 2024

(54) METHOD AND CONTROL DEVICE FOR OPERATING A CONVERTER-BASED GRID UNIT

(71) Applicant: Siemens Energy Global GmbH & Co. KG, Munich (DE)

(72) Inventors: Ervin Spahic, Erlangen (DE); Katharina Weller, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 488 days.

(21) Appl. No.: 17/627,863

(22) PCT Filed: Jul. 16, 2019

(86) PCT No.: PCT/EP2019/069155
§ 371 (c)(1),
(2) Date: Jan. 18, 2022

(87) PCT Pub. No.: WO2021/008695
PCT Pub. Date: Jan. 21, 2021

(65) Prior Publication Data
US 2022/0320862 A1 Oct. 6, 2022

(51) Int. Cl.
*H02J 3/00* (2006.01)
*G05B 19/042* (2006.01)

(52) U.S. Cl.
CPC ......... *H02J 3/0012* (2020.01); *G05B 19/042* (2013.01); *G05B 2219/2639* (2013.01); *H02J 2203/20* (2020.01)

(58) Field of Classification Search
CPC .. H02J 3/0012; H02J 2203/20; H02J 2203/10; H02J 13/00004; H02J 13/00032;
(Continued)

(56) References Cited

U.S. PATENT DOCUMENTS 9,318,979 B2 4/2016 Fischer et al.
2018/0373827 A1* 12/2018 Meagher ................ G05B 17/02
(Continued)

FOREIGN PATENT DOCUMENTS

| EP | 3625867 B1 | 7/2021 |
| WO | WO 2012156261 A2 | 11/2012 |
| WO | WO 2014205089 A1 | 12/2014 |

OTHER PUBLICATIONS

Tran Viet Thang et al; "A Robust Power Management Strategy With Multi-Mode Control Features for an Integrated PV and Energy Storage System to Take the Advantage of ToU Electricity Pricing"; IEEE Transactions on Industry Applications; vol. 55; No. 2; pp. 2110-2120; DOI: 10.1109/TIA.2018.2884622; 2019;.
(Continued)

*Primary Examiner* — Rami R Okasha
(74) *Attorney, Agent, or Firm* — Laurence A. Greenberg; Werner H. Stemer; Ralph E. Locher

(57) ABSTRACT

A method for operating a converter-based grid unit disposed electrically within an AC voltage section or adjacently to an AC voltage section of an electrical grid and electrically connected to the AC voltage section, includes using a control device to adjust infeed and drawing of active power and/or reactive power into and from the AC voltage section by actuating at least one converter of the converter-based grid unit. A multiplicity of measurement values is transmitted to the control device. The measurement values at least relate to different measurement variables and/or measurement locations within the AC voltage section or the converter-based grid unit. The control device selects a measurement value group from the multiplicity of available measurement values by selecting in accordance with a predefined selection guideline, and the at least one converter is actuated based on
(Continued)

measurement values of the selected measurement value group.

11 Claims, 6 Drawing Sheets

(58) Field of Classification Search
CPC .. H02J 3/36; H02J 3/16; G05B 19/042; G05B 2219/2639; Y02E 40/30; Y02E 40/70; Y02E 60/00; Y02E 60/60; Y04S 10/22; Y04S 40/20
See application file for complete search history.

(56) References Cited

U.S. PATENT DOCUMENTS

| | | | |
|---|---|---|---|
| 2019/0271731 A1* | 9/2019 | Miron | G01R 31/52 |
| 2020/0136540 A1* | 4/2020 | Brombach | H02J 3/381 |
| 2020/0271095 A1* | 8/2020 | Yu | F03D 7/0272 |

OTHER PUBLICATIONS

Marten Anne-Katrin: Operation of Meshed High Voltage Direct Current (HVDC) Overlay Grids—From Operational Planning To Real Time Operation; 2015, ISBN 978-3-86360-112-6; 2015;.
Lesnicar Anton et al.: "An Innovative Modular Multilevel Converter Topology Suitable for a Wide Power Range", IEEE Bologna Power Tech Conference, Jun. 23-26, 2003, Bologna, Italy; 2003.

* cited by examiner

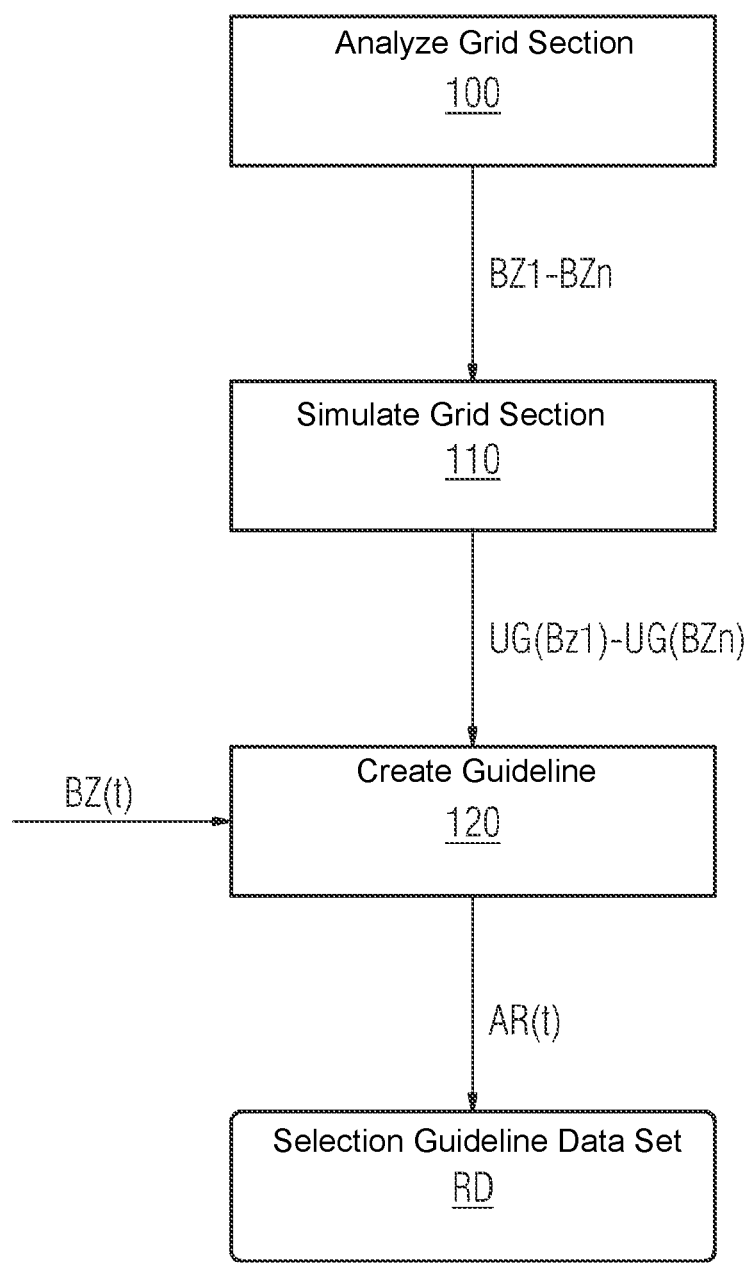

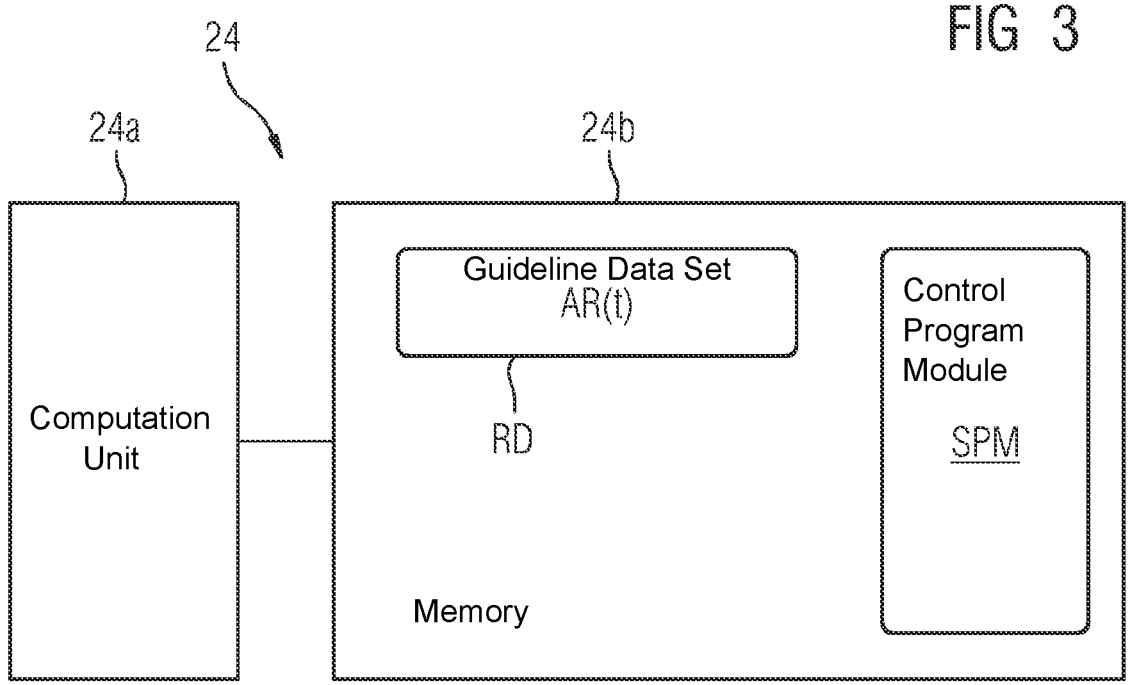
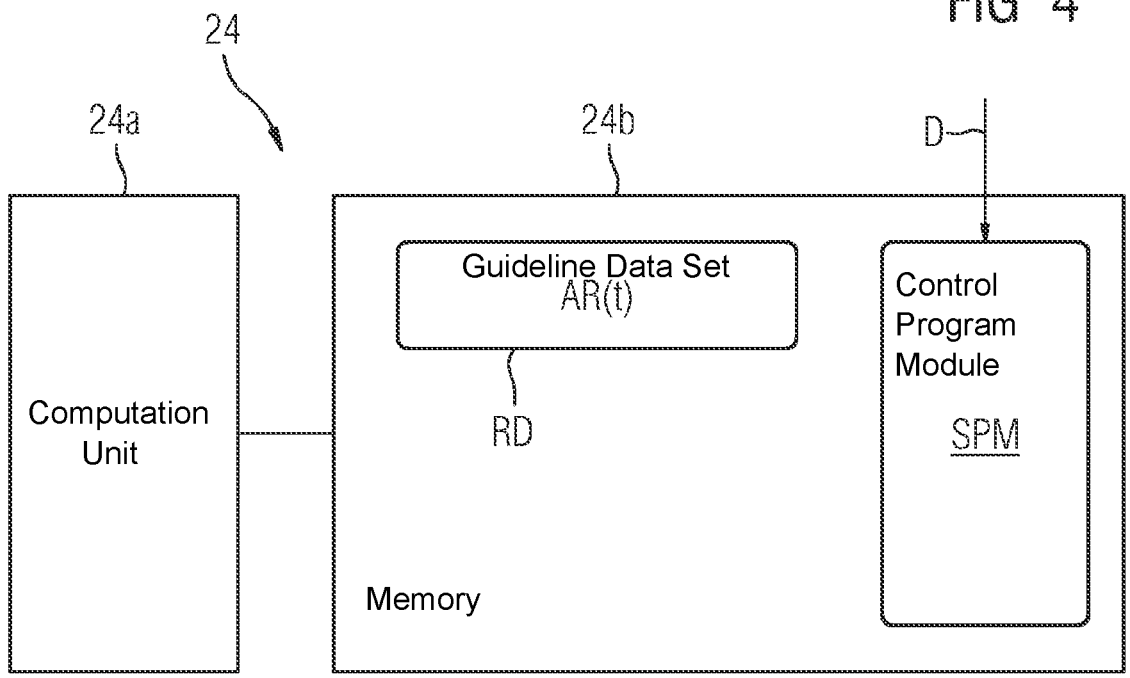

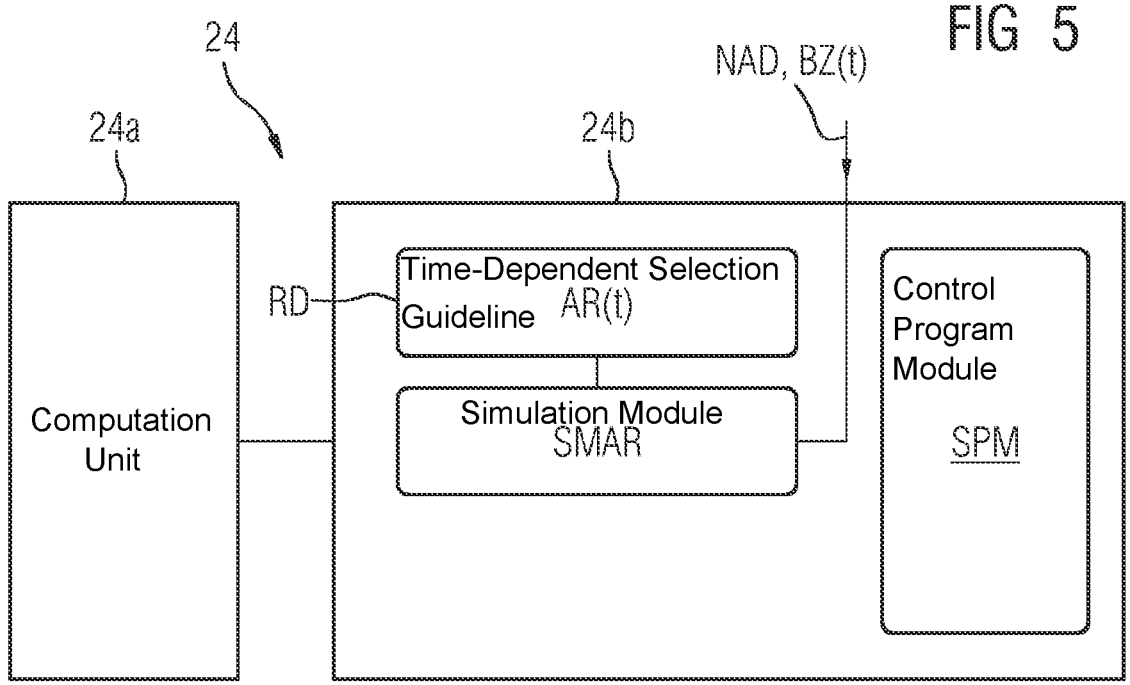
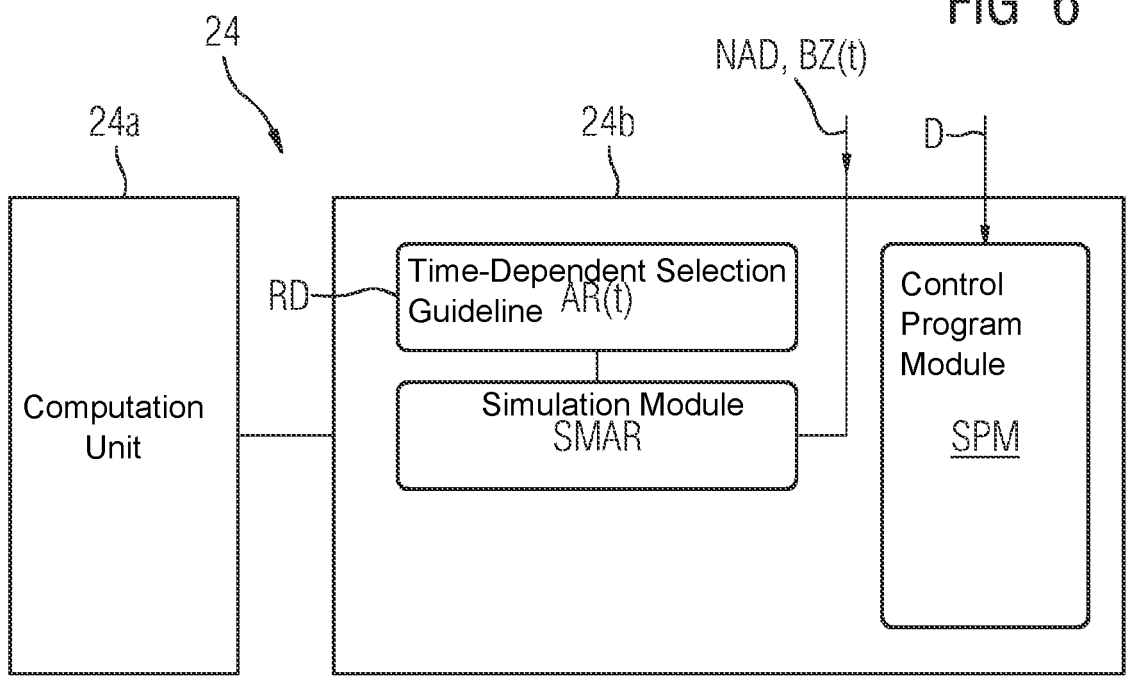

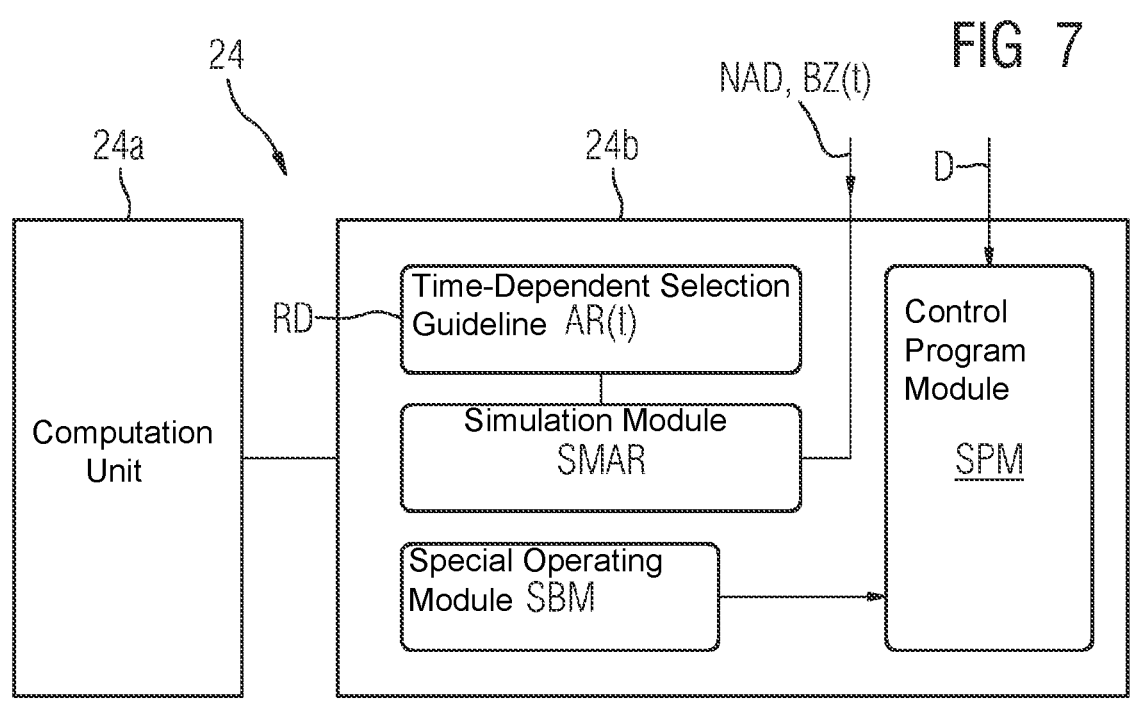

METHOD AND CONTROL DEVICE FOR OPERATING A CONVERTER-BASED GRID UNIT

FIELD AND BACKGROUND OF THE INVENTION

The invention relates to a method for operating a converter-based grid unit, which is arranged electrically within an AC voltage section or adjacent to an AC voltage section of an electrical grid and is electrically connected to said AC voltage section, wherein, in the method, a control device adjusts the infeed and drawing of active power and/or reactive power into and from the AC voltage section through actuation of at least one converter of the converter-based grid unit.

SUMMARY OF THE INVENTION

The converter or converters of the converter-based grid unit may be multilevel converters, for example, as are described in the international patent application WO 2012/156261 A2 or the document "An Innovative Modular Multilevel Converter Topology Suitable for Wide Power Range" (A. Lesnicar and R. Marquardt, 2003 IEEE Bologna Power Tech Conference, Jun. 23-26, 2003, Bologna, Italy).

The invention is based on the object of specifying a method for operating a converter-based grid unit that can be carried out with particularly little computation outlay.

This object is achieved according to the invention by way of a method having the features described below.

Advantageous embodiments of the method according to the invention are specified in dependent claims.

Accordingly, the invention makes provision for a plurality of measurement values to be transmitted to the control device, which measurement values at least also relate to different measurement variables and/or different measurement locations within the AC voltage section or the converter-based grid unit, and for the control device to select a respective measurement value group from the plurality of available measurement values by selecting in accordance with a predefined selection guideline, and for the at least one converter to be actuated on the basis of the measurement values of the respectively selected measurement value group.

One key advantage of the method according to the invention consists in the control device not always having to take all of the available measurement values into consideration for the actuation of the converter-based grid unit, but instead only the measurement values of the measurement value group defined by the selection guideline, and the other measurement values not found in the respective measurement value group can be disregarded.

The measurement value groups preferably contain less than 75%, particularly preferably less than half, of the measurement values available to the control device at each time or at least on average over time.

The measurement variables or measurement values may be electrical measurement variables or measurement values (for example voltage, current, power, phase position, etc.) and/or non-electrical measurement variables or measurement values (for example temperature, wind speed, solar irradiation or possible icing).

The operation of the AC voltage section will generally be dependent on time, in particular will be dependent on the time of day, calendar day or calendar month and/or the season, and will be variable over time at least with respect to the load flow; it is therefore advantageous if the selection guideline is also dependent on time and the selected measurement value groups take the respective current or at least the forecast load flow into consideration.

The selection guideline is preferably created on the basis of forecast future operating states of the AC voltage section.

As an alternative or in addition, provision may advantageously be made for the selection guideline to be created depending on external data, wherein the external data are data other than the aforementioned measurement values from which the control device selects a respective measurement value group and uses same to actuate the converter. Measurement values of external sensors (temperature values, wind speed values, solar irradiation values, icing values) or other types of data, such as the electricity price, for example, can be considered as external data.

As an alternative or in addition, provision may advantageously be made for the selection guideline to have been created on the basis of forecast future operating states of the AC voltage section and to be modified depending on external data.

The selection guideline preferably takes the respective forecast operating state of the AC voltage section and furthermore at least one possible deviation from the forecast operating state into consideration for each time.

It is advantageous in particular if the at least one deviation taken into consideration or one of the deviations taken into consideration relates to a failure or a malfunction of one or more components of the AC voltage section, a maintenance or shutdown of a line or a grid section, or a planned maintenance or planned shutdown of a line or a grid section.

It is also advantageous if the at least one deviation taken into consideration or one of the deviations taken into consideration relates to a load fluctuation in the AC voltage section.

The at least one deviation taken into consideration or one of the deviations taken into consideration may also advantageously relate to an operating change in one or more further converter-based grid units which form a constituent part of the AC voltage section.

Furthermore, the at least one deviation taken into consideration or one of the deviations taken into consideration may relate to external data, whether it be a deviation from expected setpoint data or the departure from an expected setpoint data window, wherein the external data are data other than the aforementioned measurement values from which the control device selects a respective measurement value group and uses same to actuate the converter.

The at least one deviation taken into consideration or one of the deviations taken into consideration may also advantageously relate otherwise to a deviation of the electricity price from an expected electricity price or the departure from an expected electricity price window.

The selection guideline preferably also takes dynamic processes into consideration in the event of a fault or a load fluctuation in the AC voltage section.

In a variant that is considered to be particularly advantageous, provision is made for the control device to prioritize the measurement values within the respective selected measurement value group and to take this prioritization into consideration in the actuation of the at least one converter, wherein the prioritization at least also includes the fact that the actuation of the at least one converter leads to a relative deviation of a measurement value of the selected measurement value group from a setpoint measurement value predefined for said measurement value being smaller than the relative deviation of another, less prioritized measurement value of the selected measurement value group from another setpoint measurement value predefined for said other measurement value.

The selection guideline is preferably determined for different forecast operating states of the AC voltage section through simulation of the converter-based grid unit and the AC voltage section or at least one subsection of the AC voltage section influenced by the converter-based grid unit and is stored in a memory of the control device in the form of a selection guideline dataset.

The selection guideline is preferably created with the proviso that the measurement value groups each have a minimum number of measurement values, using which it is still possible to actuate the converter for the forecast operating states and the deviations thereof including dynamic processes in the event of deviations taking into consideration the compliance with target parameters predefined for the electrical grid.

The selection guideline is preferably configured in such a way that the selected measurement value group comprises in each case at least two measurement values relating to the AC voltage section at at least one time, preferably at each time.

As an alternative or in addition, the selection guideline may advantageously be designed in such a way that the measurement value group comprises more measurement values relating to the AC voltage section than measurement values relating to the converter at at least one time, preferably at each time.

As an alternative or in addition, the selection guideline may advantageously be configured in such a way that the measurement value group comprises at most 50% of the present measurement values at each time.

It is also considered to be advantageous if, in the case of a special operating state, which differs from the operating states of the AC voltage section taken into consideration in the selection guideline by more than a predefined extent, a special selection guideline is calculated through simulation of the converter-based grid unit and the AC voltage section or at least one subsection of the AC voltage section influenced by the converter-based grid unit, taking into consideration all of the current measurement values available to the control device and the special selection guideline is taken into consideration in the actuation of the at least one converter instead of the selection guideline.

In one advantageous variant, the converter-based grid unit comprises two converters and a DC line which connects the two converters, wherein the two converters are connected to different connection points of the AC voltage section.

In another advantageous variant, the converter-based grid unit is formed by a single converter which is connected to the AC voltage section.

The invention furthermore relates to a control device for operating a converter-based grid unit, which is arranged within an AC voltage section or adjacent to an AC voltage section of an electrical grid, wherein the control device is designed to adjust the infeed and drawing of active power and/or reactive power into and from the AC voltage section through actuation of at least one converter of the converter-based grid unit.

According to the invention, with respect to such a control device, provision is made for the control device to be configured to receive a plurality of measurement values, which at least also relate to different measurement locations and/or different measurement locations within the AC voltage section or the converter-based grid unit, and for the control device to be configured to select a respective measurement value group from the plurality of available measurement values by selecting in accordance with a predefined selection guideline, and to actuate the at least one converter on the basis of the measurement values of the respectively selected measurement value group.

With regard to the advantages and with regard to advantageous embodiments of the control device according to the invention, reference is made to the above explanations in connection with the method according to the invention and the advantageous embodiments of the method according to the invention.

The invention is explained in more detail below with reference to exemplary embodiments.

BRIEF DESCRIPTION OF THE FIGURES

FIG. 2 shows a schematic flowchart illustrating possible method steps for the purpose of forming a time-dependent selection guideline or a selection guideline dataset for a control device of the converter-based grid unit in accordance with FIG. 1, FIGS. 3-7 show various exemplary embodiments for control devices that can be used in the converter-based grid unit in accordance with FIG. 1.

DETAILED DESCRIPTION OF THE INVENTION

For the sake of clarity, the same reference signs are always used for identical or comparable components in the figures.

Figure 1:
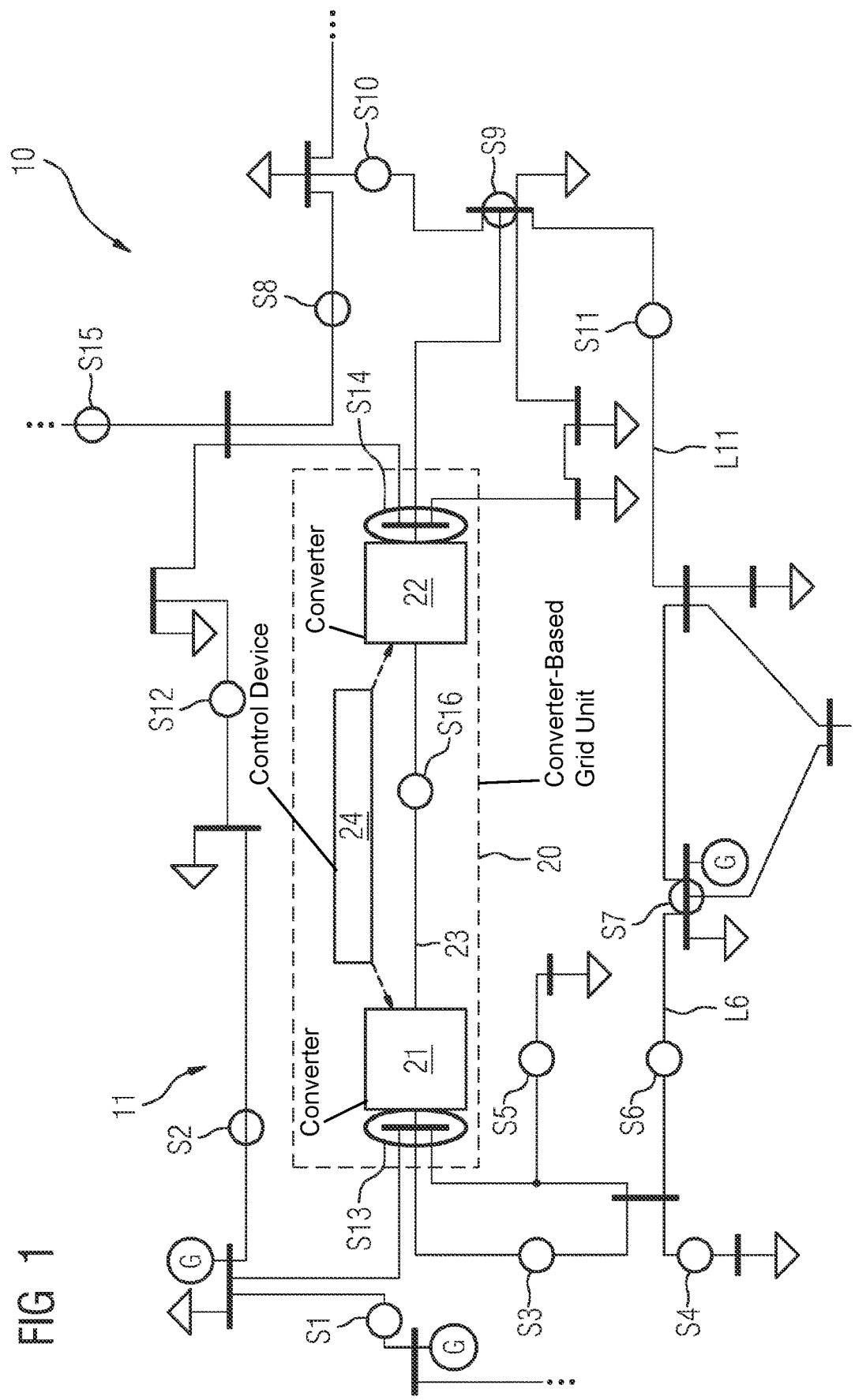
FIG. 1 shows an exemplary embodiment for a grid section of an electrical grid provided with a converter-based grid unit having a high-voltage direct-current transmission line.

FIG. 1 shows a grid section 10 of an electrical grid. Electrical current consumers, generators G and a converter-based grid unit 20, which has a converter 21 arranged on the left of FIG. 1, a converter 22 arranged on the right of FIG. 1, and a high-voltage direct-current line 23 connecting the two converters 21 and 22, are arranged within an AC voltage section 11 of the grid section 10. The converter-based grid unit 20 is provided with a control device 24 for the actuation of the two converters 21 and 22.

The control device 24 is connected via connection lines, which are not illustrated for reasons of clarity, to a plurality of sensors, which are denoted in FIG. 1 by the reference signs S1 to S16. The sensors S1 to S16 may each refer to a measurement variable or a plurality of measurement variables and each transmit a plurality of measurement values to the control device 24. As shown in FIG. 1, the sensors S1 to S16 may be arranged at different measurement locations within the AC voltage section 11 as well as at or within the converter-based grid unit 20.

The sensors may detect electrical measurement variables (for example voltage, current, power, phase position, etc.) and/or non-electrical measurement variables (for example temperature, wind speed, solar irradiation or possible icing) and transmit same as measurement values to the control device 24.

Owing to the plurality of sensors S1 to S16, a plurality of measurement values is thus available to the control device 24 at each time, said measurement values being able to be used by said control device for the actuation of the two converters 21 and 22. If the control device 24 were to take all present measurement values into consideration at each time, a very high degree of computation power would be necessary.

In order to relieve the control device 24 of load, the exemplary embodiment in accordance with FIG. 1 makes provision for the control device 24 not to have to always take into consideration all of the measurement values that are supplied by the sensors S1 to S16 in accordance with a predefined selection guideline for each time, but instead—as far as possible—in each case only measurement value groups, also referred to subsequently as measurement value subgroups, since the measurement value groups are not intended to comprise all of the available measurement values—at least on average over time. The two converters 21 and 22 can thus be actuated on the basis of the respectively selected measurement value subgroup.

In order to ensure that the control device 24 can actuate the two converters 21 and 22 as best as possible in spite of the restriction of the number of measurement values to be taken into consideration and despite the restriction to measurement value groups, the selection of the measurement values or the respectively selected measurement value subgroup ought to be selected as suitably as possible.

FIG. 2 illustrates a schematic flowchart that illustrates by way of example the formation of measurement value subgroups and the formation of selection guidelines:

In a pre-analysis step 100, the grid section 10 of the electrical grid shown in FIG. 1 is first analyzed to determine which operating states in the grid section are to be expected or are highly likely to arise.

The corresponding operating states BZ1 to BZn are each subsequently analyzed in more detail in a simulation step 110. For each operating state, it is respectively ascertained which of the sensors S1 to S16 provide particularly relevant measurement values for the respective operating state and which sensors are less relevant or irrelevant. If in the simulation step 110 it is determined, for example, that in the operating state BZ1 the two lines L6 and L11 that are populated with the sensors S6 and S11 are only subjected to a low load and conduct relatively little current and would only be affected a little even in the case of grid disruptions or in the case of failure of components, the measurement values of the sensors S6 and S11 can be qualified as irrelevant for said operating state BZ1 and be omitted in the determination of the measurement value subgroup UG(BZ1) for said operating state BZ1. In contrast, other sensors that in the operating state BZ1 will measure particularly high currents or would be particularly affected in the case of a grid disruption, for example in the case of a failure of a component of the grid section 10, are incorporated into the measurement value subgroup UG(BZ1).

Measurement value subgroups UG(BZ1) to UG(BZn) for each of the operating states BZ1 to BZn of the pre-analysis step 100 are correspondingly formed through simulation of the grid section 10. When the measurement value subgroups are determined, it is not only the respective setpoint operating state that is preferably taken into consideration but also furthermore deviations from said setpoint operating state as well as dynamic processes that arise, which may arise in the case of a failure of components and/or a significant change in the respective operating state.

In a subsequent guideline creation step 120, the measurement value subgroups UG(BZ1) to UG(BZn) formed within the scope of the simulation step 110 are combined in a time-dependent selection guideline AR(t) taking into consideration operating forecast data BZ(t) present on the input side and dependent on the time t, said selection guideline being stored in a selection guideline dataset RD. The operating forecast data BZ(t) describe the expected operation of the electrical grid and the grid section 10, that is to say for example the load flows expected in the time profile for a future time period; the time-dependent selection guideline AR(t) therefore takes the expected operating states into consideration and has a respective suitable measurement value subgroup available for this.

FIG. 3 shows an exemplary embodiment for a control device 24 that can be used in the converter-based grid unit 20 in accordance with FIG. 1. The control device 24 in accordance with FIG. 3 has a computation unit 24a and a memory 24b. The guideline dataset RD with the time-dependent selection guideline AR(t) is stored in the memory 24b, as have been created for example in accordance with the method in accordance with FIG. 2.

Furthermore, the memory 24b stores a control program module SPM, which actuates the converters 21 and 22 depending on the measurement values of the sensors S1 to S16. In this case, the control program module SPM will not always take all of the measurement values M into consideration at each time, but instead only those measurement values that are to be taken into consideration in accordance with the selection guideline dataset RD or the time-dependent selection guideline AR(t) stored therein for each time, since only these are particularly relevant to the respective operating state of the grid section.

FIG. 4 shows a further exemplary embodiment for a control device 24 that can be used to actuate the two converters 21 and 22 of the converter-based grid unit 20 in accordance with FIG. 1. In the exemplary embodiment in accordance with FIG. 4, the control program module SPM is additionally designed to also take into consideration external data D, in order to further refine the selection of the measurement values to be taken into consideration. For example, depending on the external data D, the control program module SPM can reject measurement values of the measurement values to be taken into consideration in accordance with the selection guideline AR(t) or additionally take other measurement values into consideration when the external data D make such a procedure seem expedient.

Measurement values of external sensors (temperature values, wind speed values, solar irradiation values, icing values) or other types of data such as the electricity price, for example, can be taken into consideration as external data D. If, for example, the electricity price falls significantly, a higher current draw and a higher loading of the electrical grid is to be expected, with the result that, depending on the current operating state, under certain circumstances, further or other sensors than those sensors already taken into consideration in the respective prepared measurement value subgroup or other or further measurement values ought to be taken into consideration.

FIG. 5 shows a further exemplary embodiment for a control device 24 that can be used to actuate the two converters 21 and 22 in accordance with FIG. 1. The control device 24 in accordance with FIG. 5 additionally has a simulation module SMAR, using which the control device 24 can determine the selection guideline dataset RD or the time-dependent selection guideline AR(t) itself. The simulation module SMAR may operate by way of example as has been explained in connection with FIG. 2. The simulation preferably takes place based on the operating forecast data BZ(t) and based on grid section data NAD, which describe the topology of the grid section 10 and are fed externally into the control device 24 and provided to the simulation module SMAR.

FIG. 6 shows a further exemplary embodiment for a control device 24 that can be used to actuate the two converters 21 and 22 in accordance with FIG. 1. The embodiment variant in accordance with FIG. 6 has a simulation module SMAR, as has been explained in connection with FIG. 5, and is furthermore designed to take external data D into consideration, as has been explained in connection with FIG. 4. The embodiment variant in accordance with FIG. 6 therefore constitutes a combination of the embodiment variants in accordance with FIGS. 4 and 5, with the result that the above explanations in connection with these figures apply accordingly to the variant in accordance with FIG. 6.

FIG. 7 shows an exemplary embodiment for a control device 24 for actuating the two converters 21 and 22 in accordance with FIG. 1, in which a special operating module SBM is additionally stored in a memory 24b. The special operating module SBM is used to generate a special selection guideline SAR in the case of a special operating state that differs by more than a predefined extent from the operating states of the grid section 10 that are taken into consideration in the selection guideline AR(t). The special selection guideline SAR is preferably calculated through simulation of the converter-based grid unit 20 and the AC voltage section 11 taking into consideration all of the current measurement values available to the control device 24, that is to say all of the measurement values of all of the sensors S1 to S16.

While the special operating state exists, the control program module SPM will preferably take into consideration or use the special selection guideline created instead of the selection guideline AR(t) stored in the guideline dataset RD.

Figure 8:
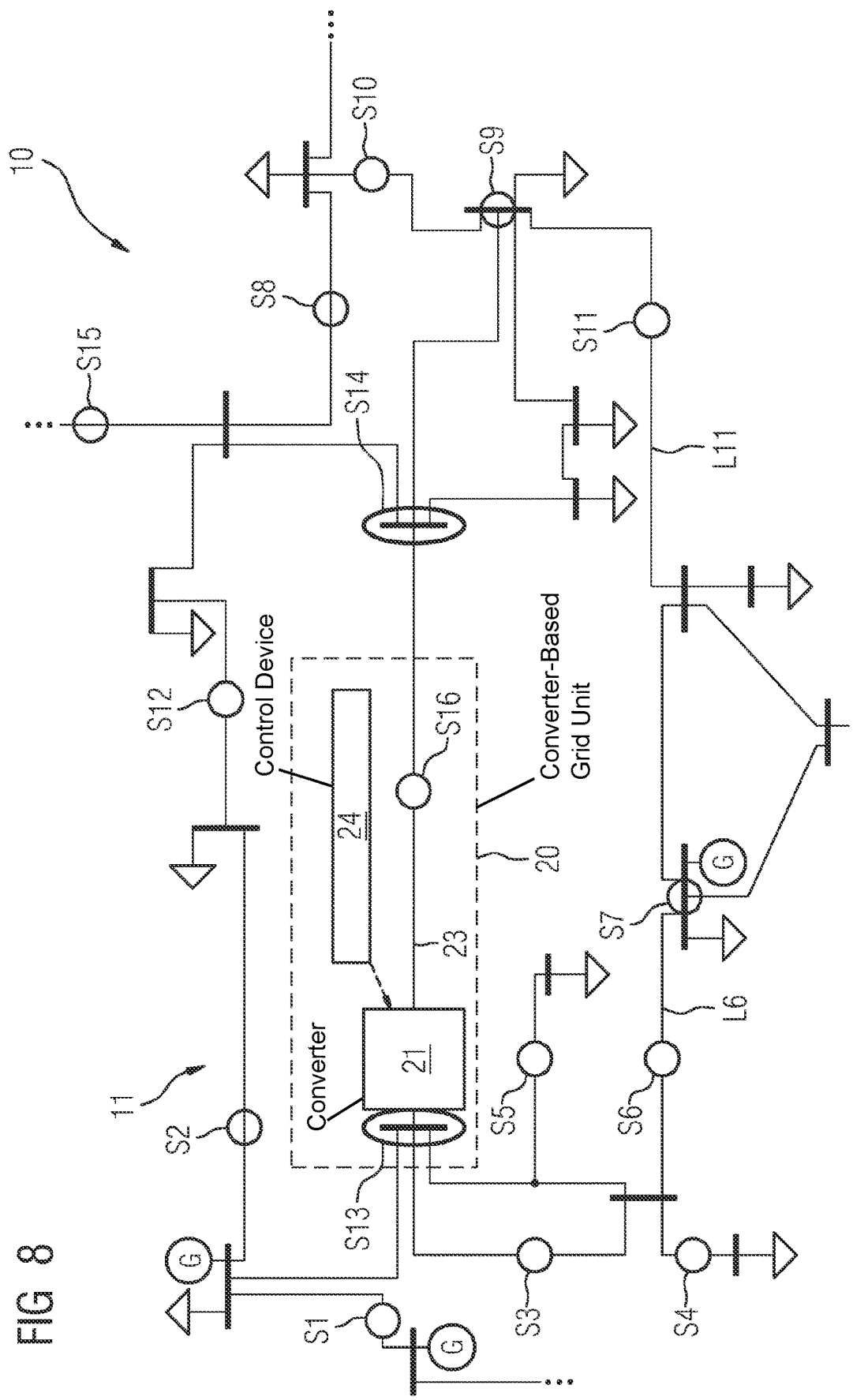
FIG. 8 shows a further exemplary embodiment for a grid section provided with a converter-based grid unit, wherein the converter-based grid unit in the exemplary embodiment in accordance with FIG. 8 is formed by a single converter.

FIG. 8 shows a further exemplary embodiment of a grid section of an electrical grid 10. In contrast to the exemplary embodiment in accordance with FIG. 1, the converter-based grid unit 20 does not consist of two or more converters but instead only of a single converter 21, which is actuated by the control device 24. With respect to the selection of measurement values and the formation of measurement value subgroups, the above explanations in connection with FIGS. 1 to 7 apply accordingly. The control device 24 will preferably actuate the converter 21 in such a way that it feeds reactive power into the AC voltage section 11 or draws reactive power from the AC voltage section 11.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

LIST OF REFERENCE SIGNS

10 Grid section
11 AC voltage section
20 Converter-based grid unit
21 Converter
22 Converter
23 High-voltage direct-current line
24 Control device
24a Computation unit
24b Memory
100 Pre-analysis step
110 Simulation step
120 Guideline creation step
AR(t) Time-dependent selection guideline
BZ Operating forecast data
BZ1-BZn Operating states
D External data
G Generator
L6 Line
L11 Line
M Measurement value
NAD Grid section data
RD Selection guideline dataset
S1-S14 Sensors
SAR Special selection guideline
SBM Special operating module
SMAR Simulation module
SPM Control program module
t Time
UG Measurement value (sub)group

The invention claimed is:

1. A method for operating a converter-based grid unit disposed electrically within an AC voltage section or adjacent to an AC voltage section of an electrical grid and electrically connected to the AC voltage section, the method comprising:
   using a control device to adjust an infeed and a drawing of at least one of active power or reactive power into and from the AC voltage section by actuation of at least one converter of the converter-based grid unit;
   transmitting a multiplicity of measurement values to the control device, the measurement values at least also relating to at least one of different measurement variables or different measurement locations within the AC voltage section or the converter-based grid unit;
   using the control device to select a respective measurement value group from the multiplicity of available measurement values by selecting in accordance with a predefined selection guideline, and actuating the at least one converter based on the measurement values of the respectively selected measurement value group;
   using the control device to prioritize the measurement values within the respective selected measurement value group and to take the prioritization into consideration in the actuation of the at least one converter; and
   including in the prioritization at least also that the actuation of the at least one converter leads to a relative deviation of a measurement value of the selected measurement value group from a setpoint measurement value predefined for the measurement value being smaller than the relative deviation of another, less prioritized measurement value of the selected measurement value group from another setpoint measurement value predefined for the other measurement value.

2. The method according to claim 1, which further comprises:
   operating the AC voltage section in dependence on time and varying operation of the AC voltage section over time at least with respect to load flow; and
   defining the selection guideline to be dependent on time and taking a respective current or forecast load flow into consideration for the selected measurement value groups.

3. The method according to claim 1, which further comprises at least one of:
   creating the selection guideline based on forecast future operating states of the AC voltage section, or
   creating the selection guideline depending on external data, the external data being data other than the measurement values from which the control device selects and uses a respective measurement value group to actuate the converter, or creating the selection guideline based on forecast future operating states of the AC voltage section being modified depending on external data, the external data being data other than the measurement values from which the control device selects and uses a respective measurement value group to actuate the converter.

4. The method according to claim 1, which further comprises using the selection guideline to take a respective forecast operating state of the AC voltage section and at least one possible deviation from the forecast operating state into consideration each time.

5. The method according to claim 4, which further comprises at least one of:
relating the at least one deviation or one of the deviations to a failure or a malfunction of one or more components of the AC voltage section, a maintenance or shutdown of a line or a grid section, or a planned maintenance or planned shutdown of a line or a grid section, or
relating the at least one deviation or one of the deviations to a load fluctuation in the AC voltage section, or
relating the at least one deviation or one of the deviations to an operating change in one or more further converter-based grid units forming a constituent part of the AC voltage section, or
relating the at least one deviation or one of the deviations to external data being a deviation from expected setpoint data or a departure from an expected setpoint data window, the external data being data other than the measurement values from which the control device selects and uses a respective measurement value group to actuate the converter, or
relating the at least one deviation or one of the deviations to a deviation of an electricity price from an expected electricity price or a departure from an expected electricity price window.

6. The method according to claim 4, which further comprises creating the selection guideline when the measurement value groups each have a minimum number of measurement values still permitting actuation of the converter for the forecast operating states and the at least one possible deviation thereof including dynamic processes in an event of deviations taking into consideration compliance with target parameters predefined for the electrical grid.

7. The method according to claim 1, which further comprises taking dynamic processes into consideration for the selection guideline in an event of a fault or a load fluctuation in the AC voltage section.

8. The method according to claim 1, which further comprises determining the selection guideline for different forecast operating states of the AC voltage section by simulation of the converter-based grid unit and the AC voltage section or at least one subsection of the AC voltage section influenced by the converter-based grid unit, and storing the selection guideline in a memory of the control device as a selection guideline dataset.

9. The method according to claim 1, which further comprises at least one of:
configuring the selection guideline in such a way that the selected measurement value group includes in each case at least two measurement values relating to the AC voltage section at least at one time or at each time, or
configuring the selection guideline in such a way that the measurement value group includes more measurement values relating to the AC voltage section than measurement values relating to the converter at least at one time or at each time, or
including at most 50% of the available measurement values at each time in the measurement value group.

10. The method according to claim 1, which further comprises:
providing the converter-based grid unit with two converters and a DC line connecting the two converters, and connecting the two converters to different connection points of the AC voltage section, or
providing the converter-based grid unit with a single converter connected to the AC voltage section.

11. A method for operating a converter-based grid unit disposed electrically within an AC voltage section or adjacent to an AC voltage section of an electrical grid and electrically connected to the AC voltage section, the method comprising:
using a control device to adjust an infeed and a drawing of at least one of active power or reactive power into and from the AC voltage section by actuation of at least one converter of the converter-based grid unit;
transmitting a multiplicity of measurement values to the control device, the measurement values at least also relating to at least one of different measurement variables or different measurement locations within the AC voltage section or the converter-based grid unit;
using the control device to select a respective measurement value group from the multiplicity of available measurement values by selecting in accordance with a predefined selection guideline, and actuating the at least one converter based on the measurement values of the respectively selected measurement value group;
during a special operating state differing by more than a predefined extent from the operating states of the AC voltage section taken into consideration in the selection guideline, calculating a special selection guideline by simulation of the converter-based grid unit and the AC voltage section or at least one subsection of the AC voltage section influenced by the converter-based grid unit, taking into consideration all of the current measurement values available to the control device; and
taking the special selection guideline, instead of the selection guideline, into consideration in the actuation of the at least one converter.

* * * * *